United States Patent
Aoki

(10) Patent No.: US 10,941,810 B2
(45) Date of Patent: Mar. 9, 2021

(54) SLIDING MEMBER

(71) Applicant: TAIHO KOGYO CO., LTD., Toyota (JP)

(72) Inventor: Maki Aoki, Miyoshi (JP)

(73) Assignee: TAIHO KOGYO CO., LTD., Toyota (JP)

(*) Notice: Subject to any disclaimer, the term of this patent is extended or adjusted under 35 U.S.C. 154(b) by 0 days.

(21) Appl. No.: 16/603,068

(22) PCT Filed: Feb. 26, 2019

(86) PCT No.: PCT/JP2019/007218
§ 371 (c)(1),
(2) Date: Oct. 4, 2019

(87) PCT Pub. No.: WO2019/225098
PCT Pub. Date: Nov. 28, 2019

(65) Prior Publication Data
US 2021/0003172 A1  Jan. 7, 2021

(30) Foreign Application Priority Data

May 25, 2018  (JP) ................... 2018-100387

(51) Int. Cl.
*B32B 15/01* (2006.01)
*F16C 33/12* (2006.01)
(Continued)

(52) U.S. Cl.
CPC .......... *F16C 33/121* (2013.01); *B23P 15/003* (2013.01); *F16C 17/02* (2013.01);
(Continued)

(58) Field of Classification Search
None
See application file for complete search history.

(56) References Cited

U.S. PATENT DOCUMENTS

| 4,278,740 A | * | 7/1981 | Nara | ............... C22C 21/003 384/912 |
| 4,471,029 A | * | 9/1984 | Fukuoka | ............. B32B 15/012 148/415 |

(Continued)

FOREIGN PATENT DOCUMENTS

| CN | 101705460 A | 5/2010 |
| CN | 102869800 A | 1/2013 |

(Continued)

OTHER PUBLICATIONS

Communication dated Jul. 30, 2020 from German Patent Office in DE Application No. 11 2019 000 047.0.
(Continued)

*Primary Examiner* — Seth Dumbris
(74) *Attorney, Agent, or Firm* — Sughrue Mion, PLLC

(57) ABSTRACT

Provided is a sliding member capable of realizing the wear resistance effect by Si particles.
The sliding member includes an aluminum alloy layer containing 7.0% by mass or more and 13.0% by mass or less of Sn, 6.5% by mass or more and 12.0% by mass or less of Si, 0.5% by mass or more and 3.0% by mass or less of Cu, unavoidable impurities, and a balance Al. Si particles are dispersed in the aluminum alloy layer. A Vickers hardness of a matrix of the aluminum alloy layer is 40 HV or more and 60 HV or less. A load resistance value, which is a product of a volume concentration and average area of the Si particles and the Vickers hardness of the matrix, is 0.00001 N or more and 0.00029 N or less.

1 Claim, 4 Drawing Sheets

(51) Int. Cl.
    *B23P 15/00* (2006.01)
    *F16C 17/02* (2006.01)
    *F16C 33/14* (2006.01)

(52) U.S. Cl.
    CPC ............ *F16C 33/124* (2013.01); *F16C 33/14* (2013.01); *F16C 2202/04* (2013.01); *F16C 2204/22* (2013.01); *F16C 2220/06* (2013.01); *F16C 2220/44* (2013.01); *F16C 2220/82* (2013.01); *F16C 2220/84* (2013.01); *F16C 2240/48* (2013.01); *F16C 2240/94* (2013.01); *Y10T 428/12736* (2015.01); *Y10T 428/12757* (2015.01)

(56) References Cited

U.S. PATENT DOCUMENTS

| | | | |
|---|---|---|---|
| 4,696,867 A * | 9/1987 | Eastwood | ............ C22C 21/003 428/650 |
| 6,875,290 B2 * | 4/2005 | Kagohara | ............ B32B 15/012 148/437 |
| 2003/0102059 A1 | 6/2003 | Kagohara et al. | |
| 2013/0108197 A1 | 5/2013 | Sakamoto et al. | |

FOREIGN PATENT DOCUMENTS

| | | |
|---|---|---|
| CN | 106244893 A | 12/2016 |
| EP | 0 131 428 A1 | 1/1985 |
| EP | 2 562 282 A1 | 2/2013 |
| GB | 2 144 149 A | 2/1985 |
| JP | 57-188641 A | 11/1982 |
| JP | 60-36641 A | 2/1985 |
| JP | 2-57653 A | 2/1990 |
| JP | 2003-155533 A | 5/2003 |
| JP | 3472284 B2 | 12/2003 |
| JP | 2015-071797 A | 4/2015 |
| KR | 10-2012-0115601 A | 10/2012 |
| WO | 2011/132788 A1 | 10/2011 |

OTHER PUBLICATIONS

Written Opinion for PCT/JP2019/007218, dated May 21, 2019.
International Search Report for PCT/JP2019/007218, dated May 21, 2019.
Communication dated Jun. 2, 2020, from the China National Intellectual Property Administration in Application No. 201980001247.6.

* cited by examiner

SLIDING MEMBER

TECHNICAL FIELD

The present invention relates to a sliding member provided with an aluminum alloy layer.

BACKGROUND ART

In sliding bearings of engines for automobiles and industrial machines, aluminum alloys based on Al—Sn—Si ternary alloys are widely used as bearing alloys. Generally, in aluminum-based bearing alloys, Sn is added to provide conformability, and Si is added to provide wear resistance. In the Al—Sn—Si ternary alloys, precipitates of Si (hereinafter referred to as "Si particles") are formed, and the characteristics of the bearing alloys are influenced by the size of the Si particles. Therefore, the optimization of the particle diameter of the Si particles is attempted as in Patent Literature 1.

CITATIONS LIST

Patent Literature

Patent Literature 1: JP 3472284 B

SUMMARY OF INVENTION

Technical Problems

However, when the matrix is soft even though the Al—Sn—Si ternary alloy contains hard Si particles, there is a problem that the Si particles are pushed by the counter material and thus easily buried in the matrix. When the Si particles are buried in the matrix, the wear resistance effect obtained by the Si particles is lost.

The present invention has been made in view of the above problems, and an object thereof is to provide a technique capable of realizing the wear resistance effect by Si particles.

Solutions to Problems

The sliding member according to the present invention includes an aluminum alloy layer containing 7.0% by mass or more and 13.0% by mass or less of Sn, 6.5% by mass or more and 12.0% by mass or less of Si, 0.5% by mass or more and 3.0% by mass or less of Cu, unavoidable impurities, and the balance Al, in which Si particles are dispersed in the aluminum alloy layer, in which a Vickers hardness of a matrix of the aluminum alloy layer is 40 HV (4.08 $N/mm^2$) or more and 60 HV (6.12 $N/mm^2$) or less, and in which a load resistance value, which is a product of a volume concentration and average area of the Si particles and the Vickers hardness of the matrix, is 0.00001 N or more and 0.00029 N or less.

In the above configuration, by setting the Vickers hardness of the matrix of the aluminum alloy layer to 40 HV or more and 60 HV or less, good mechanical strength can be secured. Furthermore, by setting the load resistance value, which is the product of the volume concentration and average area of the Si particles in the aluminum alloy layer and the Vickers hardness of the matrix, to 0.00001 N or more and 0.00029 N or less, the Si particles can be prevented from being buried in the matrix, so that the wear resistance effect by the Si particles can be realized.

By increasing the volume concentration of the Si particles, the load from the counter material can be dispersed by many Si particles, thereby making it possible to prevent the individual Si particles from being buried in the matrix. Also, by increasing the average area of the Si particles, it is possible to increase the resistance when pushing the individual Si particles into the matrix, thereby making it possible to prevent the individual Si particles from being buried in the matrix. Furthermore, by increasing the Vickers hardness of the matrix, it is possible to increase the resistance when pushing the individual Si particles into the matrix, thereby making it possible to prevent the individual Si particles from being buried in the matrix.

Furthermore, even when the Vickers hardness of the matrix cannot be increased, the wear resistance effect by the Si particles can be realized by increasing at least one of the volume concentration and the average area of the Si particles. Even when the volume concentration of the Si particles cannot be increased, the wear resistance effect by the Si particles can be realized by increasing at least one of the Vickers hardness of the matrix and the average area of the Si particles. Furthermore, even when the average area of the Si particles cannot be increased, the wear resistance effect by the Si particles can be realized by increasing at least one of the Vickers hardness of the matrix and the volume concentration of the Si particles.

DESCRIPTION OF EMBODIMENTS

Embodiments of the present invention will be described in the following order.
(1) Structure of sliding bearing:
(1-1) Evaluation of wear resistance:
(2) Method for manufacturing sliding bearing:
(3) Experimental result:
(4) Other Embodiments:

(1) Structure of Sliding Bearing

Figure 1A:
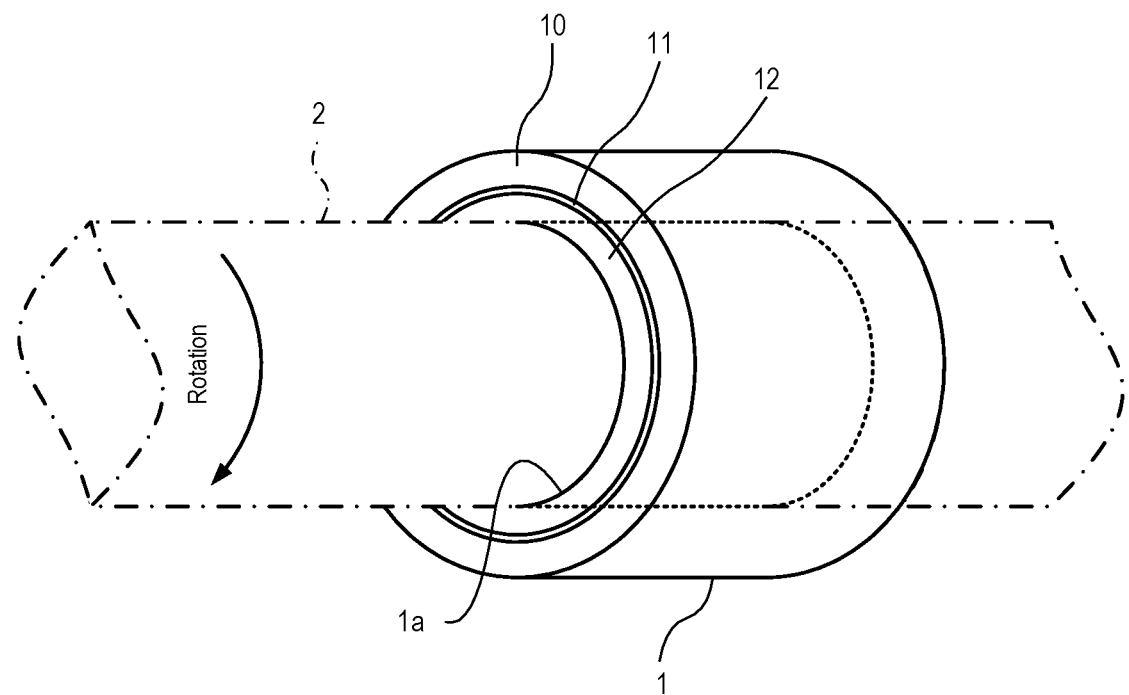
FIG. 1A is a perspective view of a sliding bearing.

FIG. 1A is a perspective view of a sliding bearing 1 (floating bush) as a sliding bearing according to an embodiment of the present invention. The sliding bearing 1 is, for example, a journal bearing used in a transmission or an oil pump. The sliding bearing 1 is formed in a cylindrical shape, and the cross section orthogonal to the axial direction has an annular shape.

The sliding bearing 1 has a structure in which a back metal 10, an intermediate layer 11, and a lining 12 are laminated in an order of being distant from the center of curvature. Thus, the back metal 10 constitutes the outermost layer of the sliding bearing 1, and the lining 12 constitutes the innermost layer of the sliding bearing 1. The back metal 10, the intermediate layer 11, and the lining 12 each have a constant thickness in the circumferential direction. Twice the radius of the surface on the curvature center side of the lining 12 (the inner diameter of the sliding bearing 1) is 22 mm. The width of the sliding bearing 1 is 10 mm. Hereinafter, the term "inner side" means the curvature center side of the sliding bearing 1, and the term "outer side" means the side opposite to the center of curvature of the sliding bearing 1. The inner surface of the lining 12 constitutes the sliding surface for a counter shaft 2.

The back metal 10 is formed of steel containing 0.15% by mass of C, 0.06% by mass of Mn, and the balance Fe. It suffices that the back metal 10 is formed of a material that can support the load from the counter shaft 2, and the back metal 10 may not necessarily be formed of steel. The intermediate layer 11 is formed of, for example, pure Al. It suffices that the intermediate layer 11 is formed of a material that can alleviate the impact from the counter shaft 2, and the intermediate layer 11 may not necessarily be formed of pure Al.

An oil film of engine oil as lubricating oil is formed between the sliding bearing 1 and the counter shaft 2. The rotation of the counter shaft 2 causes the counter shaft 2 to slide on a sliding surface 1a which is the inner surface of the sliding bearing 1. Although not shown, a thrust bearing that supports the load acting on the counter shaft 2 in the thrust direction may also be formed of the same aluminum alloy as that of the sliding bearing 1. Alternatively, the sliding bearing 1 may be formed by combining two half-split bearing parts in a cylindrical shape.

The lining 12 is a layer laminated inside the back metal 10. The lining 12 is composed of an aluminum alloy layer having a surface on which the counter shaft 2 slides. The aluminum alloy layer will be described below. The lining 12 contains 7.0 to 13.0% by mass (more preferably 11.5 to 12.5% by mass) of Sn, 6.5 to 12.0% by mass (more preferably 7.0 to 8.0% by mass) of Si, 0.5 to 4.0% by mass (more preferably 0.5 to 1.5% by mass) of Cu, unavoidable impurities, and Al (balance). The unavoidable impurities are Mg, Ni, Ti, B, Pb, Cr, and the like, and are impurities mixed in refining or scrapping. The content of the unavoidable impurities is 1.0% by mass or less as a whole. The mass of each element in the lining 12 was measured by an ICP emission spectrometer (ICPS-8100 manufactured by Shimadzu Corporation).

Figure 1B:
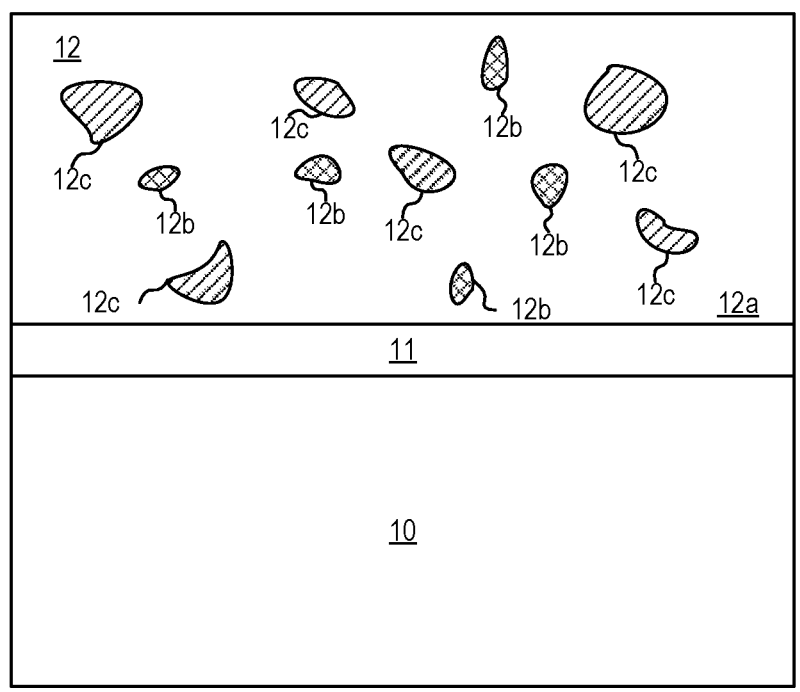
FIG. 1B is a schematic cross-sectional view of the sliding bearing.

FIG. 1B is a schematic cross-sectional view of the sliding bearing 1. In the lining 12, Si particles 12b and Sn particles 12c are dispersed in a matrix 12a. In the lining 12, Si and Sn are separately precipitated to form the Si particles 12b and the Sn particles 12c. In the lining 12, Cu forms a solid solution with the matrix 12a. The volume concentration of the Si particles 12b in the lining 12 is 5.6% by volume, and the average area of the Si particles is 113.1 µm². The volume concentration of the Si particles 12b is obtained by converting the mass concentration to the volume concentration by the specific gravity. In addition, it can be considered that the entire amount of Si is precipitated as the Si particles 12b in the lining 12. In addition, an image obtained by imaging the surface of the lining 12 was input into an image analyzer (LUZEX_AP manufactured by NIRECO CORPORATION), and the equivalent circle diameter (measurement parameter: HEYWOOD) was measured for the respective images of the Si particles 12b. The average value of the equivalent circle diameters of the respective images of the Si particle 12b was calculated, and the area of the circle where the average value of the equivalent circle diameters corresponds to the length of the diameter was measured as the average area for Si particles 12b.

The Vickers hardness of the lining 12 at room temperature was 51 HV. The size of the indentation (average of the lengths of the two diagonal lines) formed at a measurement point on the surface of the lining 12 with a load of 100 g was measured as the Vickers hardness at the measurement point, using a micro Vickers hardness meter (MVK-EII manufactured by Akashi Seisakusho, Ltd.). The average value of the Vickers hardnesses measured at 5 measurement points (5 points excluding 2 points where the Vickers hardnesses were maximum and minimum, respectively, from 7 measurement points) on a test specimen was measured as the Vickers hardness of the matrix 12a of the lining 12. In addition, the measurement point was provided on the matrix 12a. In the above configuration, the load resistance value, which is the product of the volume concentration and average area of the Si particles 12b in the lining 12 and the Vickers hardness of the matrix 12a, is 0.0000331 N.

Figure 2:
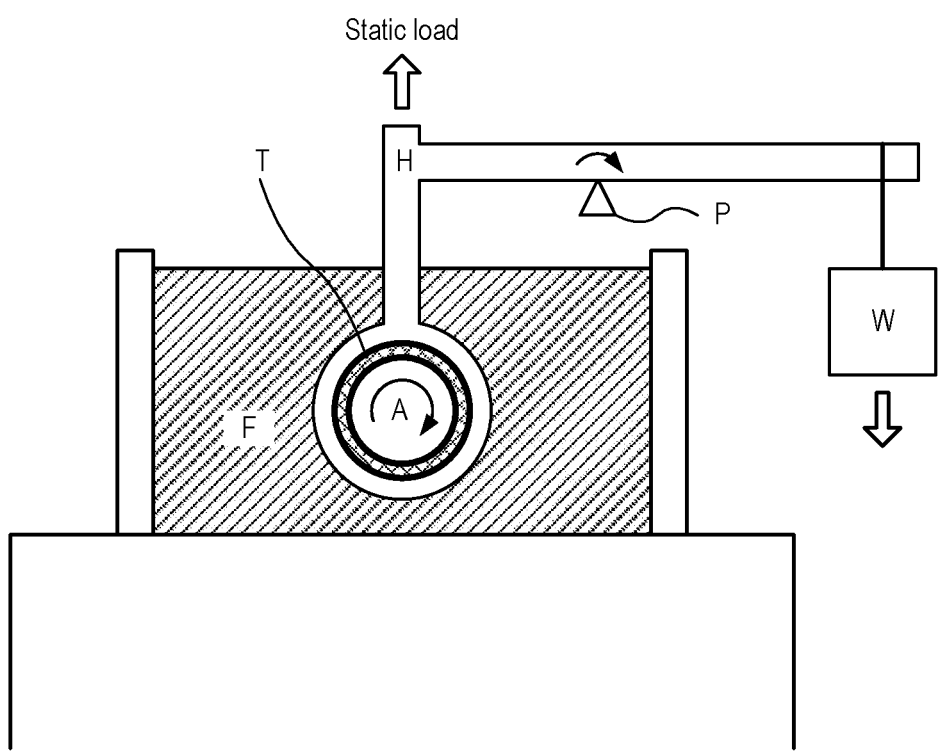
FIG. 2 is an explanatory view of a wear test.

(1-1) Evaluation of Wear Resistance:

A wear test was conducted to evaluate the wear resistance of the sliding bearing 1. FIG. 2 is a schematic view illustrating a bush tester used for the wear test. The wear test was conducted by rotating a counter material A supported by a test bush T. The test bush T was fixed onto a fixing jig H, and a weight W was connected to one end of the fixing jig H. The fixing jig H is rotatable at a fulcrum P, and is configured so that an upward static load acts on the test bush T by the gravity acting on the weight W.

Here, the test bush T is formed under the same conditions and formed of the same material as the sliding bearing 1. Various conditions such as the material for the counter material A, the size of the test bush T, the weight of the weight W, and the temperature of the lubricating oil were set to be consistent with those during the use of the sliding bearing 1. The test time was 50 hours or more. After the wear test was conducted under the above conditions, the amount of wear of the test bush T was measured. The amount of wear of the test bush T is an amount of reduction of the thickness of the test bush T. In the test bush T, the lowermost part wears most.

(2) Method for Manufacturing Sliding Bearing

In the present embodiment, the sliding bearing 1 is manufactured by sequentially performing the steps of a. melting, b. continuous casting, c. cold rolling, d. cutting, and e. machining. The back metal 10 and the intermediate layer 11 may be manufactured by a known manufacturing method, and thus the method for manufacturing the lining 12 will be mainly described. The respective steps will be described below.

a. Melting

First, raw materials were weighed and prepared so as to form a lining 12 containing 12.0% by mass of Si, 7.5% by mass of Sn, 1.0% by mass of Cu, and the balance being Al and unavoidable impurities. In the present embodiment, an Al ingot, a Cu ingot, an Sn ingot, and an Si ingot were respectively weighed and prepared. Here, the raw materials each having the mass according to the mechanical characteristics of the sliding bearing 1 as the target should just be prepared. The mechanical characteristics of the sliding bearing 1 as the target are determined, for example, in accordance with the mechanical characteristics of the counter shaft 2. Next, the respective prepared raw materials are heated to 700 to 850° C. by a high frequency induction furnace. This causes each ingot to melt. Thereafter, bubbles of Ar gas are dispersed and ejected to remove hydrogen gas and inclusions.

b. Continuous Casting

Next, the molten material for the aluminum alloy layer is poured into a mold, and the aluminum alloy layer is continuously drawn out from the opening of the mold in the casting direction and cooled as it is to room temperature to form a continuously-cast sheet of the aluminum alloy layer. For example, casting is carried out at a temperature of 650 to 850° C. using a mold made of carbon, and the aluminum alloy layer is drawn at a drawing rate of 1.0 to 2.0 mm/s (preferably 1.6 to 1.8 mm/s) to form a continuously-cast sheet. By setting the concentration of Si to a high concentration and setting the drawing rate to a low speed as described above, it is possible to precipitate the Si particles 12b each having a large particle diameter in the solidification process in the continuous casting from the molten state. The load resistance value can be increased by reducing the drawing speed, and can be reduced by increasing the drawing speed. The diameter of the continuously-cast sheet of the aluminum alloy layer is made larger than the outer diameter of the sliding bearing 1 by the amount of cutting in machining.

c. Cold Rolling

Next, the continuously-cast sheet of the lining 12 and the material sheet of the intermediate layer 11 were pressure-welded and rolled by a roll pressure welding machine. Furthermore, the pressure-welded sheet of the continuously-cast sheet of the lining 12 and the material sheet of the intermediate layer 11 was annealed, and thereafter the pressure-welded sheet and the material sheet of the back metal 10 were pressure-welded by the roll pressure welding machine. By the above operations, a rolled sheet of the sliding bearing 1 in which the continuously-cast sheet of the lining 12, the material sheet of the intermediate layer 11, and the material sheet of the back metal 10 were pressure-bonded was formed. The rolled sheet of the sliding bearing 1 was further annealed and naturally cooled. By setting the rolling reduction ratio of the continuously-cast sheet of the lining 12 after continuous casting to 60% or less (preferably 50% or less), it is possible to suppress the destruction of the Si particles 12b and to maintain the particle diameter of the Si particles 12b.

d. Cutting

Next, the rolled sheet of the sliding bearing 1 was cut into pieces of a predetermined size. The predetermined size is a size at which the sliding bearing 1 is finally formed by performing machining described later, and which is determined according to the intended use of the sliding bearing 1.

f. Machining

Finally, the rolled sheet of the sliding bearing 1 after cutting is pressed to form a sliding bearing 1 having a half-split shape. Furthermore, the sliding bearing 1 was completed by finishing the shape and surface condition through cutting.

(3) Experimental Result

Table 1 indicates the configurations and the amounts of wear of Samples 1 to 6.

TABLE 1

|  | Vickers hardness of matrix [HV] | Average equilavent circle diameter of Si particles [μm] | Average area of Si particles [μm$^2$] | Concentration of Si particles [% by volume] | Load resistance value [N] | Amount of wear [μm] |
| --- | --- | --- | --- | --- | --- | --- |
| Sample 1 | 50.0 | 4.5 | 15.9 | 2.6 | 0.0000024 | 42.0 |
| Sample 2 | 52.1 | 6.0 | 28.3 | 4.5 | 0.0000068 | 31.0 |
| Sample 3 | 51.3 | 12.0 | 113.1 | 5.6 | 0.0000331 | 7.2 |
| Sample 4 | 49.8 | 14.0 | 153.9 | 9.4 | 0.0000735 | 3.5 |
| Sample 5 | 61.0 | 24.0 | 452.4 | 9.4 | 0.0002646 | 5.7 |
| Sample 6 | 107.6 | 25.0 | 490.9 | 2.6 | 0.0001401 | 7.7 |

Samples 1 to 6 are different in the hardness of the matrix 12a, and the volume concentration and average area of the Si particles 12b, and the load resistance values thereof are also different accordingly.

Figure 3:
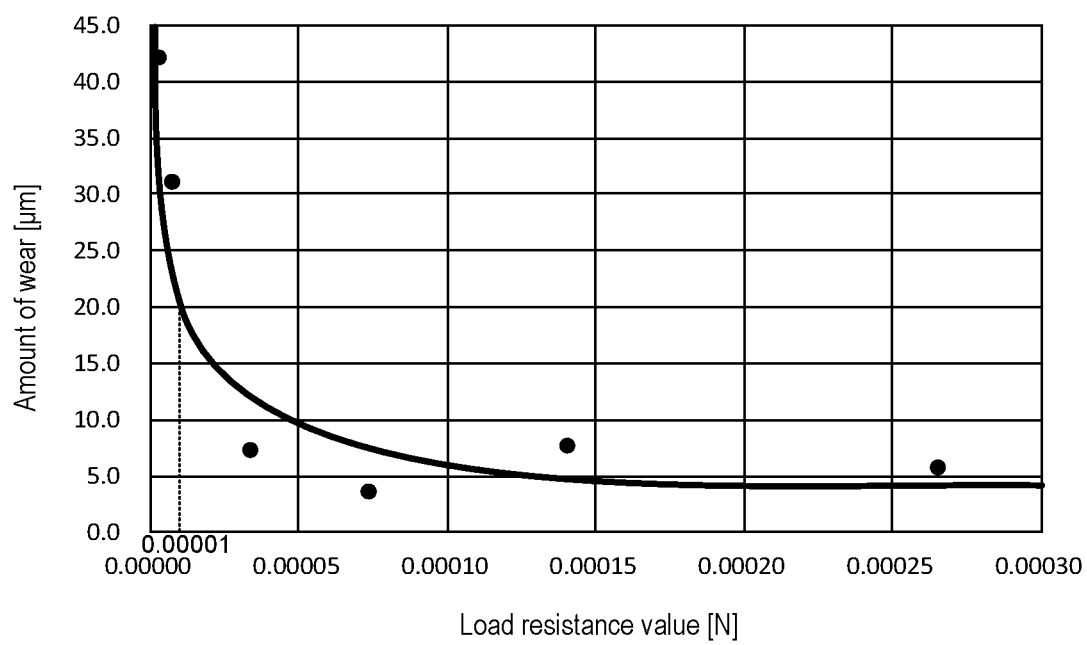
FIG. 3 is a graph showing the relationship between a load resistance value and an amount of wear.

FIG. 3 is a graph showing the relationship between the load resistance value and the amount of wear. The horizontal axis in FIG. 3 indicates the load resistance value, and the vertical axis indicates the amount of wear. As shown in the figure, it could be confirmed that the amount of wear decreased as the load resistance value increased, and that the wear resistance was improved. In addition, by setting the load resistance value to 0.00001 N or more, the amount of wear can be reduced to approximately 20.0 m or less. In addition, when the load resistance value exceeds 0.00029 N, the wear amount reduction effect decreases, and it is considered that the merit obtained by setting the load resistance value to more than 0.00029 N is small.

As indicated in Table 1, Sample 4 is smaller in hardness of the matrix 12a than Samples 1 and 2. but is larger in volume concentration and average area of the Si particles 12b than Samples 1 and 2, and thus the load resistance value is large, resulting in a reduced amount of wear. Sample 6 has smaller volume concentration and average area of the Si particles 12b than those of Samples 2 to 5, but has a larger hardness of the matrix 12a than those of Samples 2 to 5, and thus the load resistance value is large, resulting in a reduced amount of wear.

Table 2 indicates the particle diameter (average equivalent circle diameter) of the Si particles 12b when the Vickers hardness and the load resistance value become the lower limit value and the upper limit value, respectively. Table 2 indicates the particle diameter of the Si particles 12b when the concentration of the Si particles 12b ranges from 1 to 15% by volume.

TABLE 2

| Concentration of Si particles [% by volume] | Vickers hardness of matrix: 40 HV (lower limit) | | Vickers hardness of matrix: 60 HV (upper limit) | |
|---|---|---|---|---|
| | Particle diameter [μm] of Si particles at which load resistance value is 0.00001N (lower limit) | Particle diameter [μm] of Si particles at which load resistance value is 0.00029N (upper limit) | Particle diameter [μm] of Si particles at which load resistance value is 0.00001N (lower limit) | Particle diameter [μm] of Si particles at which load resistance value is 0.00029N (upper limit) |
| 1 | 17.67 | 95.13 | 14.42 | 77.67 |
| 2 | 12.49 | 67.27 | 10.20 | 54.92 |
| 3 | 10.20 | 54.92 | 8.33 | 44.85 |
| 4 | 8.83 | 47.57 | 7.21 | 38.84 |
| 5 | 7.90 | 42.54 | 6.45 | 34.74 |
| 6 | 7.21 | 38.84 | 5.89 | 31.71 |
| 7 | 6.68 | 35.96 | 5.45 | 29.36 |
| 8 | 6.25 | 33.63 | 5.10 | 27.46 |
| 9 | 5.89 | 31.71 | 4.81 | 25.89 |
| 10 | 5.59 | 30.08 | 4.56 | 24.56 |
| 11 | 5.33 | 28.68 | 4.35 | 23.42 |
| 12 | 5.10 | 27.46 | 4.16 | 22.42 |
| 13 | 4.90 | 26.38 | 4.00 | 21.54 |
| 14 | 4.72 | 25.42 | 3.85 | 20.76 |
| 15 | 4.56 | 24.56 | 3.72 | 20.06 |

Figure 4:
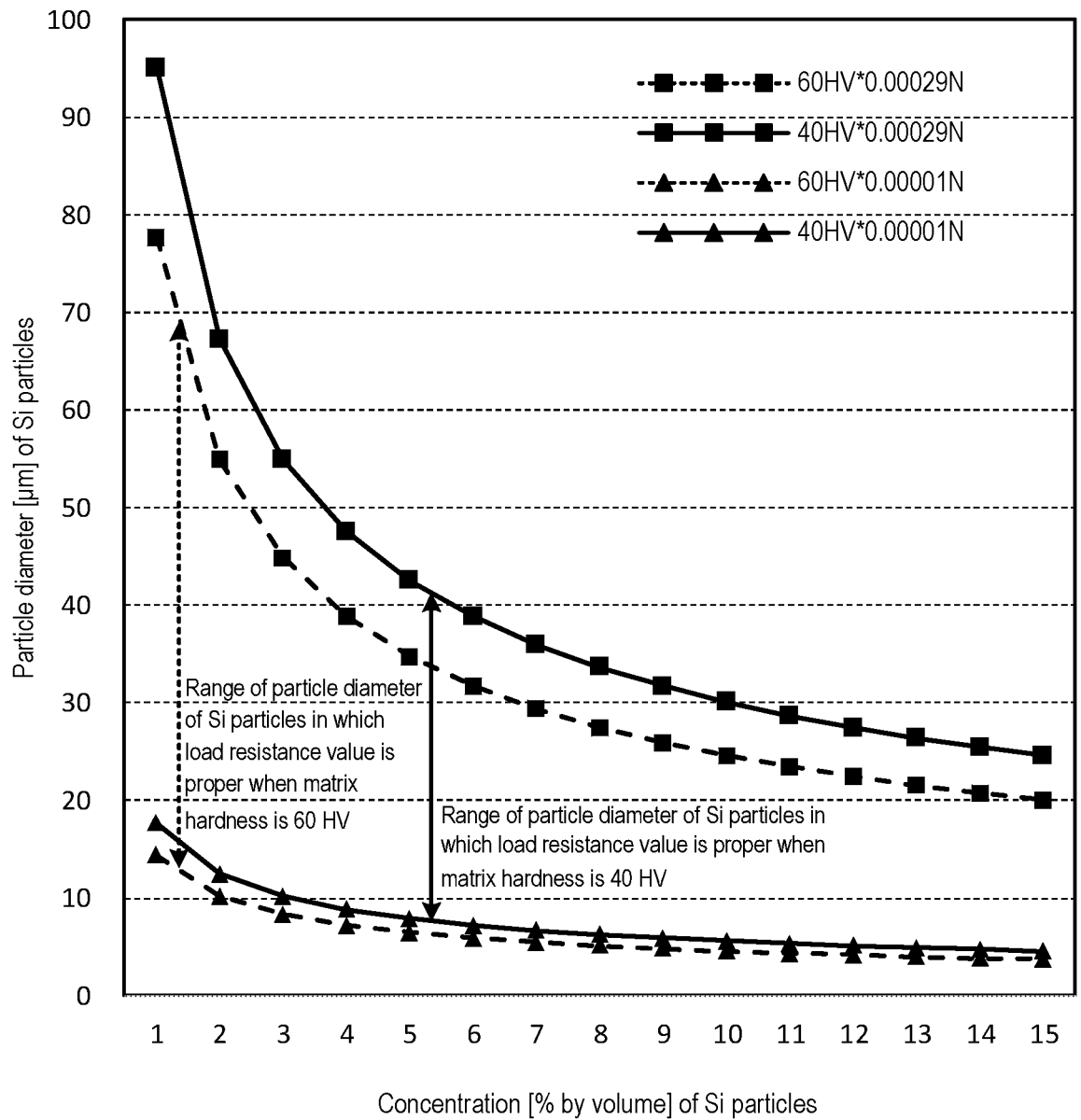
FIG. 4 is a graph showing the relationship between a concentration of Si particles and a particle diameter.

FIG. 4 is a graph obtained by plotting the values indicated in Table 2, and is a graph showing the range of the particle diameter of the Si particles 12b in which the load resistance value is proper when the hardness of the matrix 12a is 40 HV and 60 HV, respectively. The horizontal axis in FIG. 4 indicates the concentration of the Si particles 12b, and the vertical axis indicates the particle diameter of the Si particles 12b. As shown in the figure, even if the concentration of the Si particles 12b is small, the load resistance value can be made proper by increasing the particle diameter of the Si particles 12b, so that good wear resistance can be realized. Even if the particle diameter of the Si particles 12b is small, the load resistance value can be made proper by increasing the concentration of the Si particles 12b, so that good wear resistance can be realized. Moreover, even if the hardness of the matrix 12a is small, the load resistance value can be made proper by increasing at least one of the concentration of the Si particles 12b and the particle diameter of the Si particles 12b, so that good wear resistance can be realized. Note that increasing the particle diameter of the Si particles 12b means increasing the average area of the Si particles 12b.

(4) Other Embodiments

The sliding member of the present invention only needs to include an aluminum alloy layer as the layer having a surface on which the counter shaft 2 slides, and does not have to be a bimetal sliding member in which the aluminum alloy layer and any other layer (e.g., back metal) are joined. Also, a soft overlay may be applied on the aluminum alloy layer. A sliding bearing such as a transmission gear bush or a piston pin bush/boss bush may be formed by the sliding member of the present invention. Furthermore, the sliding member of the present invention may be used in thrust bearings, various washers, or swash plates for car air-conditioner compressors. Also, the back metal 10 is not essential and may not be used. Furthermore, the technical idea of the present invention can be realized also in a method for controlling the quality of the sliding member.

REFERENCE SIGNS LIST

1 Sliding bearing
1a Sliding surface
2 Counter shaft
10 Back metal
11 Intermediate layer
12 Lining
12a Matrix
12b Si particle
12c Sn particle
H Fixing jig
P Fulcrum
T Test bush
W Weight

The invention claimed is:
1. A sliding member comprising an aluminum alloy layer containing 7.0% by mass or more and 13.0% by mass or less of Sn, 6.5% by mass or more and 12.0% by mass or less of Si, 0.5% by mass or more and 3.0% by mass or less of Cu, unavoidable impurities, and a balance Al, wherein
Si particles are dispersed in the aluminum alloy layer,
the Vickers hardness of a matrix of the aluminum alloy layer is 40 HV or more and 60 HV or less, and
a load resistance value, which is a product of a volume concentration and average area of the Si particles and the Vickers hardness of the matrix, is 0.00001 N or more and 0.00029 N or less.

* * * * *